United States Patent
Kim et al.

(10) Patent No.: US 8,651,217 B2
(45) Date of Patent: Feb. 18, 2014

(54) STRUCTURE OF ENGINE MOUNT FOR VEHICLE

(75) Inventors: Yong-Jin Kim, Kwangmyung-shi (KR); Seung-Won Kim, Seoul (KR); Kong-Sup Jung, Hwasung-shi (KR); Hyo-Seok Kim, Kwangmyung-shi (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/191,879

(22) Filed: Jul. 27, 2011

(65) Prior Publication Data

US 2012/0048638 A1    Mar. 1, 2012

(30) Foreign Application Priority Data

Aug. 31, 2010   (KR) .............................. 10-2010-84568

(51) Int. Cl.
   *B60K 5/12*       (2006.01)
(52) U.S. Cl.
   USPC ........... 180/292; 180/291; 180/295; 180/297; 180/299; 180/312; 180/293; 267/292; 267/293; 267/294; 267/140.11; 267/140.3; 267/141
(58) Field of Classification Search
   USPC ....................................................... 180/293
   See application file for complete search history.

(56) References Cited

U.S. PATENT DOCUMENTS

| 5,234,271 A * | 8/1993 | Lindstrom ..................... 384/510 |
| 2002/0033594 A1* | 3/2002 | Yamamoto et al. ........... 280/781 |
| 2007/0131469 A1* | 6/2007 | Kim .............................. 180/293 |

FOREIGN PATENT DOCUMENTS

| EP | 1415847 B1 * | 9/2006 |
| JP | 8-192642 A | 7/1996 |
| JP | 8-244430 A | 9/1996 |
| KR | 10-2010-0054535 | * 5/2010 |
| KR | 10-2010-0054535 A | 5/2010 |
| KR | 10-2010-0058165 A | 6/2010 |

\* cited by examiner

*Primary Examiner* — John R Olszewski
*Assistant Examiner* — Hilary L. Johns
(74) *Attorney, Agent, or Firm* — Morgan, Lewis & Bockius LLP

(57) ABSTRACT

A structure of an engine mount is provided for a vehicle in which an engine is disposed in the front of the vehicle, a front wheel is driven, and the engine is integrally coupled with a transmission to be seated horizontally on a vehicle body in a transverse mounting direction. The structure may include a driveshaft coupled to receive the driving force of the engine through the transmission and penetrate a center bearing through a bearing bracket fixed to the engine, a subframe as a plate shape coupled to the vehicle body in a rear lower part of the engine and coupled to a lower part of the transmission through a main roll rod mounted on the front, and a sub-roll rod having one end connected to the subframe and the other end connected to the bearing bracket.

1 Claim, 5 Drawing Sheets

Unequal length driveshaft type

Equal length driveshaft type

| | |
|---|---|
| T/M | : Transmission |
| D/G | : Differential Gear |
| CVJ | : Constant Velocity Joint |
| C/S | : Center Shaft |
| B/B | : Bearing Bracket |

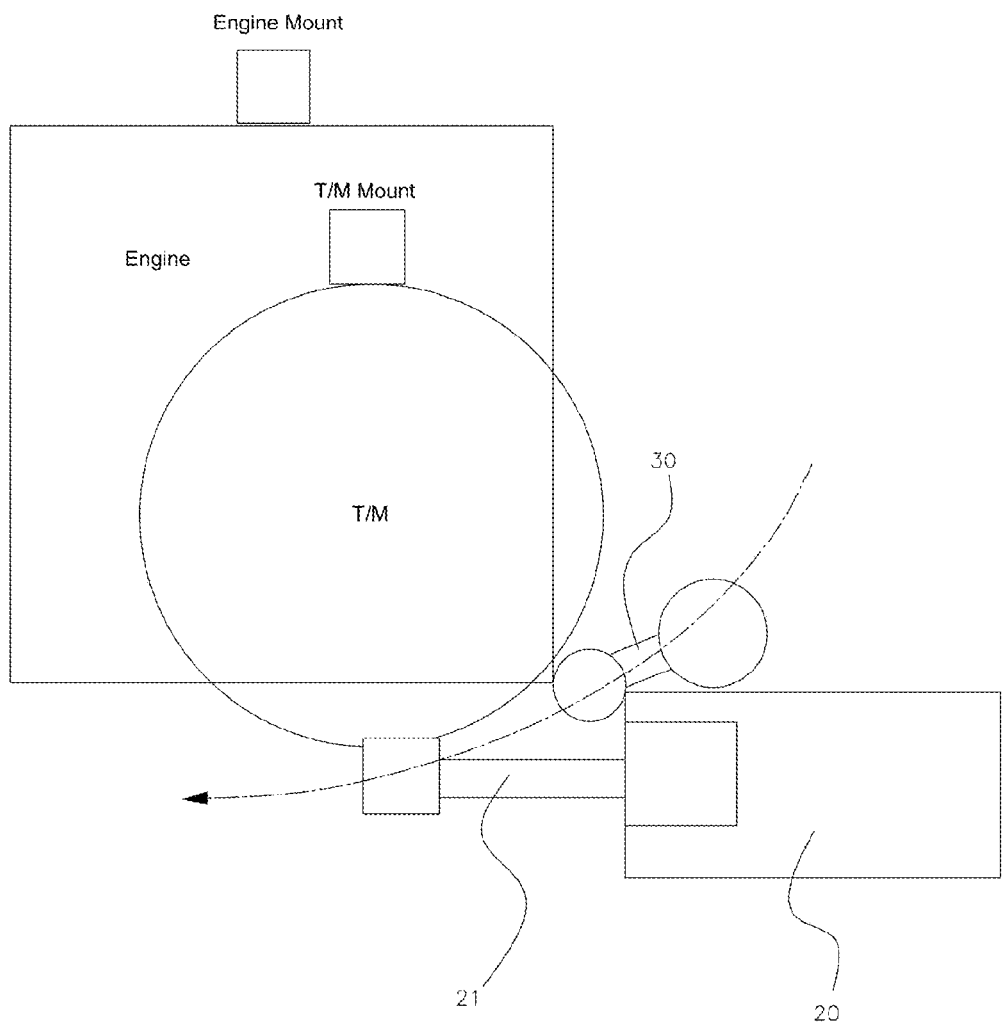

STRUCTURE OF ENGINE MOUNT FOR VEHICLE

CROSS-REFERENCE TO RELATED APPLICATIONS

This application claims priority under 35 U.S.C. §119 to Korean Patent Application No. 10-2010-84568 filed on Aug. 31, 2010, the entire contents of which application is incorporated herein for all purposes by this reference.

BACKGROUND OF INVENTION

1. Field of Invention

The present invention relates to a structure of an engine mount for a vehicle, and more particularly, to a structure of an engine mount for a vehicle in which a sub-roll rod is additionally mounted based on a structure of a known three-point mounting type engine mount to support an high-output engine more efficiently.

2. Description of Related Art

A vehicle (FF: front engine front wheel drive) of a type in which an engine is disposed in front of a vehicle and a front wheel is driven has an advantage and a disadvantage as compared with other driving types, but the structure of a driving system is simplified to be advantageous in light weight and compactness and is advantageous in broadening an indoor space because a part such as a propeller shaft transferring motive power to a rear wheel is deleted.

In particular, since the FF vehicle is advantageous in terms of productivity, the FF vehicle is widely used in an automobile. However, since a front wheel is both driven and steered, the fluctuation of torque acting on both wheels influences steering and a weight is concentrated in a front part of the vehicle.

That is, a general power transmitting process of the FF vehicle includes (1) an engine, (2) a flywheel of the engine, (3) an input shaft of a transmission, (4) an output shaft of the transmission, (5) a differential gear, (6) a constant velocity joint (CVJ), and (7) a wheel, but since the engine, the transmission (T/M), and the differential gear that are previously integrally coupled are mounted on the vehicle body, the differential gear leans toward one side around the center of the vehicle, as shown in FIG. 1A.

Therefore, the lengths of left and right constant velocity joints are different from each other to cause torque steer steering influencing the steering of a steering wheel.

As described above, in order to solve problems of unequal length driveshafts having both constant velocity joints having different lengths, equal length driveshafts have been ever developed.

A center shaft is mounted between the equal length driveshafts so that the constant velocity joints having the same length are disposed at both sides to be coupled. The center shaft rotates while engaging with the differential gear coupled with the transmission at one side thereof, while the other side is supported on a bearing bracket coupled to the lower part of the engine. In addition, a center bearing allowing rotation of the center shaft is mounted on the bearing bracket.

Meanwhile, automobiles primarily employ monocoque bodies which are light in weight and excellent in productivity instead of frame bodies. The monocoque body is a structure without an additional frame and includes a power train mounted directly on its vehicle body. Therefore, since the vehicle body itself acts as a frame in the monocoque body, suspension and chassis parts are mounted on the monocoque body, respectively, but vibration of the power train (configured by integrally coupling the engine, the transmission, and the differential gear) is prevented from being transferred directly to the vehicle body and a subframe is mounted on a lower part of a vehicle in order to disperse an impact when the vehicle collides.

The subframe may be manufactured in various shapes depending on the power and size of the vehicle, but a power train having an engine of a high displacement and a high torque employs a "#"-shaped subframe in which four bars are coupled to each other to form a rectangle. When the "#"-shaped subframe is installed in a lower part of an engine room of a vehicle body, the power train is seated thereon and mounting members (an engine mount, a transmission mount, a front roll rod, and a rear roll rod) support the power train at four points (a four-point mounting scheme).

In addition, as shown in FIG. 1B, an engine having a low displacement and a low torque has a plate shape which can be fixed to the vehicle body and a steering device can be mounted on, and an "H"-shaped subframe of which an edge protrudes to connect a suspension strut and a knuckle is mounted on the engine. The vehicle employing the "H"-shaped subframe is supported by the mounting members at three points (a three-point mounting scheme). The engine mount and the transmission mount are mounted on at both sides of the vehicle body, respectively, to support the engine and the transmission and a roll rod mounted on the subframe is coupled to the lower part of the transmission in the rear side.

Meanwhile, the four-point mounting scheme is more efficient to suppress noise, vibration, and harshness (NVH) of the vehicle by more efficiently supporting the movement of the power train, but a larger subframe is mounted to increase a total weight of the vehicle.

On the contrary, the three-point mounting scheme has an advantage in that a manufacturing cost is saved, but since the number of mounting points is reduced, there is a limit in supporting the movement of the power train or suppressing the NVH of the vehicle and a larger fatigue is aggravated to the mounts of the engine and the transmission.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a structure of an engine mount for a vehicle that supports the movement of a power train efficiently and has improved NVH performance like a four-point mounting scheme by improving a three-point mounting scheme.

Various aspects of the present invention provide for a structure of an engine mount for a vehicle in which an engine is disposed in the front of the vehicle, a front wheel is driven, and the engine is integrally coupled with a transmission to be seated on a vehicle body in a transverse mounting direction, i.e., in the width direction of the vehicle body, the structure including a driveshaft coupled to receive the driving force of the engine through the transmission and penetrate a center bearing through a bearing bracket fixed to the engine, a subframe as a plate shape coupled to the vehicle body in a rear lower part of the engine and coupled to a lower part of the transmission through a main roll rod mounted on the front, and a sub-roll rod having one end connected to the subframe and the other end connected to the bearing bracket.

One end of the sub-roll rod may be coupled to a roll rod bracket protruding upwardly on the top of the subframe and the other end thereof may be coupled to a boss formed on the end of the bearing bracket downwardly from the driveshaft so that a location of the sub-roll rod coupled with the subframe is positioned higher than a location of the sub-roll rod coupled with the bearing bracket.

The main roll rod and the sub-roll rod may be disposed to be spaced apart from each other toward different sides from the center along the longitudinal direction of the subframe.

In the sub-roll rod, a bushing coupled to the subframe may be larger than a bushing coupled to the bearing bracket.

According to various aspects of the present invention, even by employing a subframe having the smaller weight, a power train constituted by an engine and a transmission can be more efficiently supported and the NVH performance of a vehicle can be improved.

Moreover, by providing the same subframe to the same type of vehicles on which engines having various torques are mounted, manufacturing efficiency can be increased. That is, by providing an additional mounting depending on the mounting of a high-torque engine, a platform of the vehicle can be communized.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a conceptual diagram of the structure of an exemplary engine mount of a vehicle according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
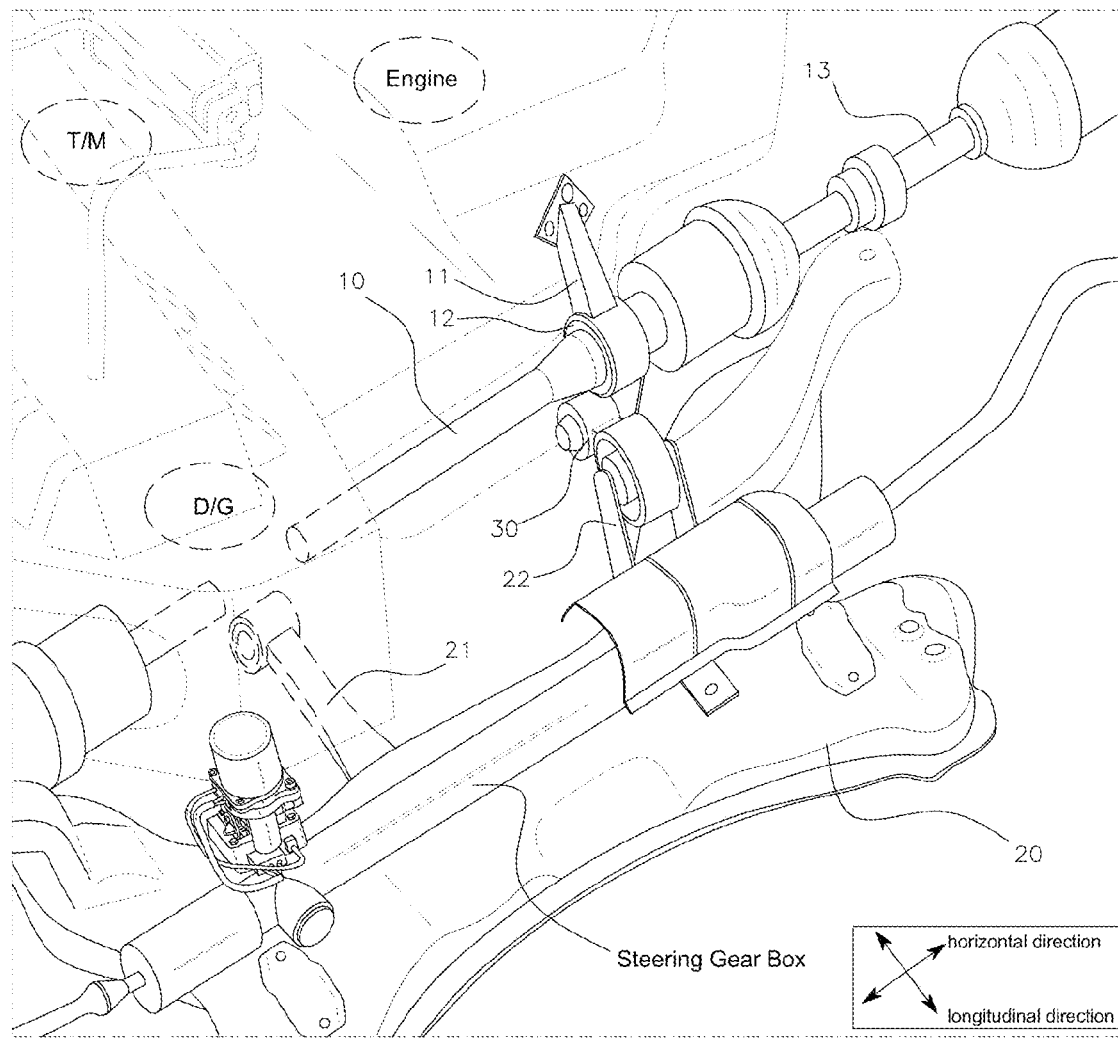
FIG. 2 is a perspective view of the structure of an exemplary engine mount for a vehicle according to the present invention when viewed from the top.

Referring to FIG. 2, in a vehicle according to various embodiments of the present invention, an engine, a transmission, and a differential gear are integrally coupled to each other to constitute a power train and seated on a vehicle body in a transverse mounting direction.

That is, the engine is mounted close to one wheel and the transmission is seated in the width direction of the vehicle to be close to the other wheel. In addition, an engine mount and a transmission mount are mounted on the engine and the transmission, respectively.

Meanwhile, a driveshaft according to various embodiments of the present invention as the equal length driveshaft includes a center shaft 10 such that both constant velocity joints 13 have the same length. The center shaft 10 is connected with the differential gear coupled with the transmission and mounted to penetrate a bearing bracket 11 coupled to a lower part of the engine to be supported horizontally on a ground surface. A center bearing 12 supporting the center shaft 10 while allowing the rotation of the center shaft 10 is installed on the bearing bracket 11 and the constant velocity joint 13 is coupled to the end of the bearing bracket 11 penetrating the center bearing 12.

Figure 1A:
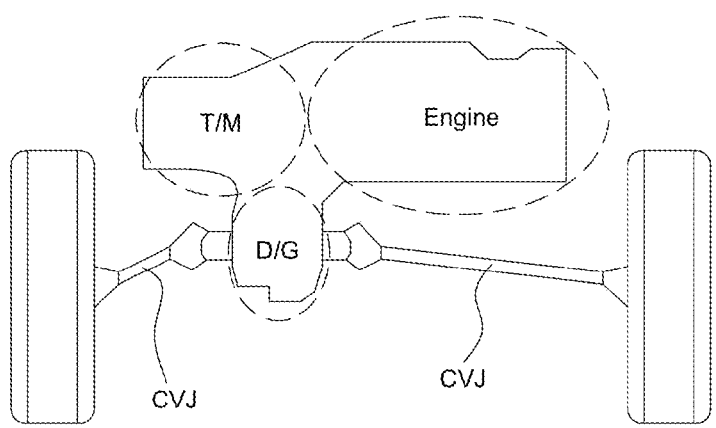
FIG. 1A is a cross-sectional view showing a comparison of the structures of an equal length driveshaft and an unequal length driveshaft.
Figure 1A:
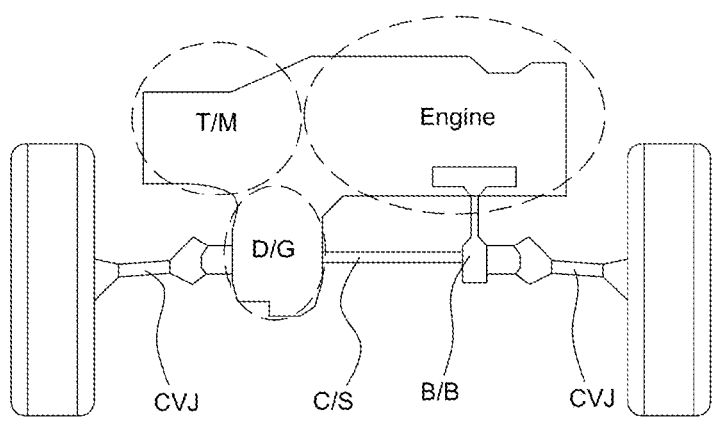
Figure 1B:
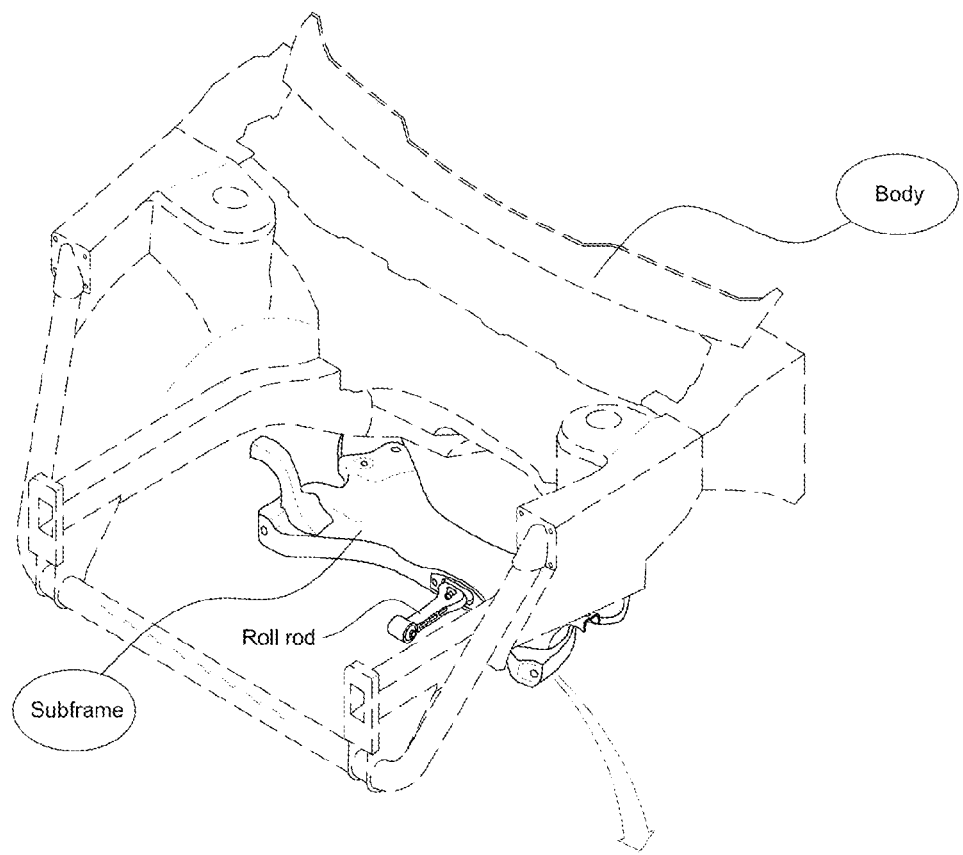
FIG. 1B is a plan view of a plate-like subframe and a perspective view showing a state in which the subframe is mounted on a vehicle body.
Figure 1B:
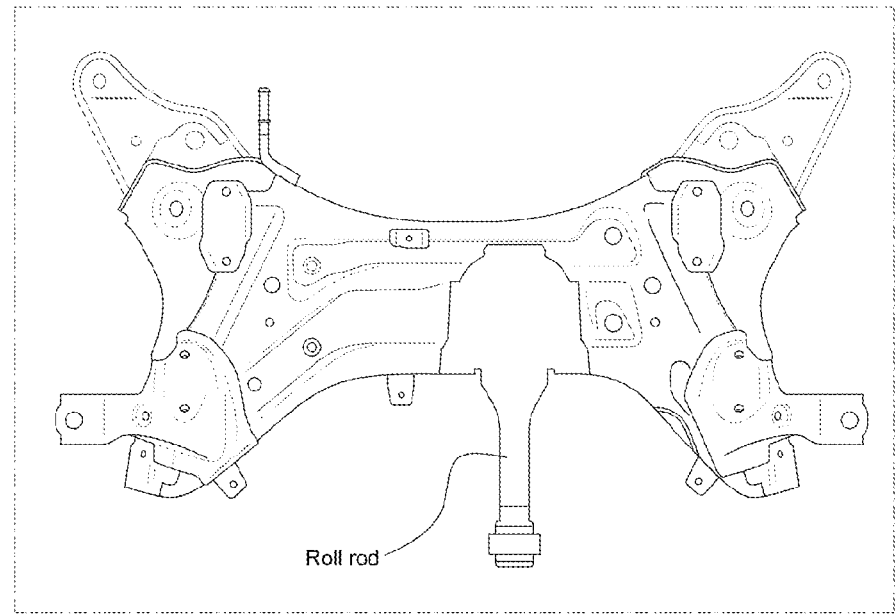

Meanwhile, a subframe 20 according to various embodiments of the present invention is implemented as a plate-like subframe (shown in FIG. 1B) applied to the known three-point mount scheme. The subframe 20 is fixed to a lower part of the vehicle body in a longitudinal-direction rear lower part of the engine and the transmission to be coupled with suspension devices and components of a steering device such as a steering gear box, and the like are seated on the subframe 20. In addition, a main roll rod 21 is mounted on the subframe 20 in front of the vehicle and the main roll rod 21 is connected to the lower part of the transmission to damp vibration and support the transmission. The main roll rod 21 has the same configuration as the known roll rod and a bushing made of a rubber material is mounted on the end thereof and elastically transformed and recovered in repetition to damp vibration.

Figure 3:
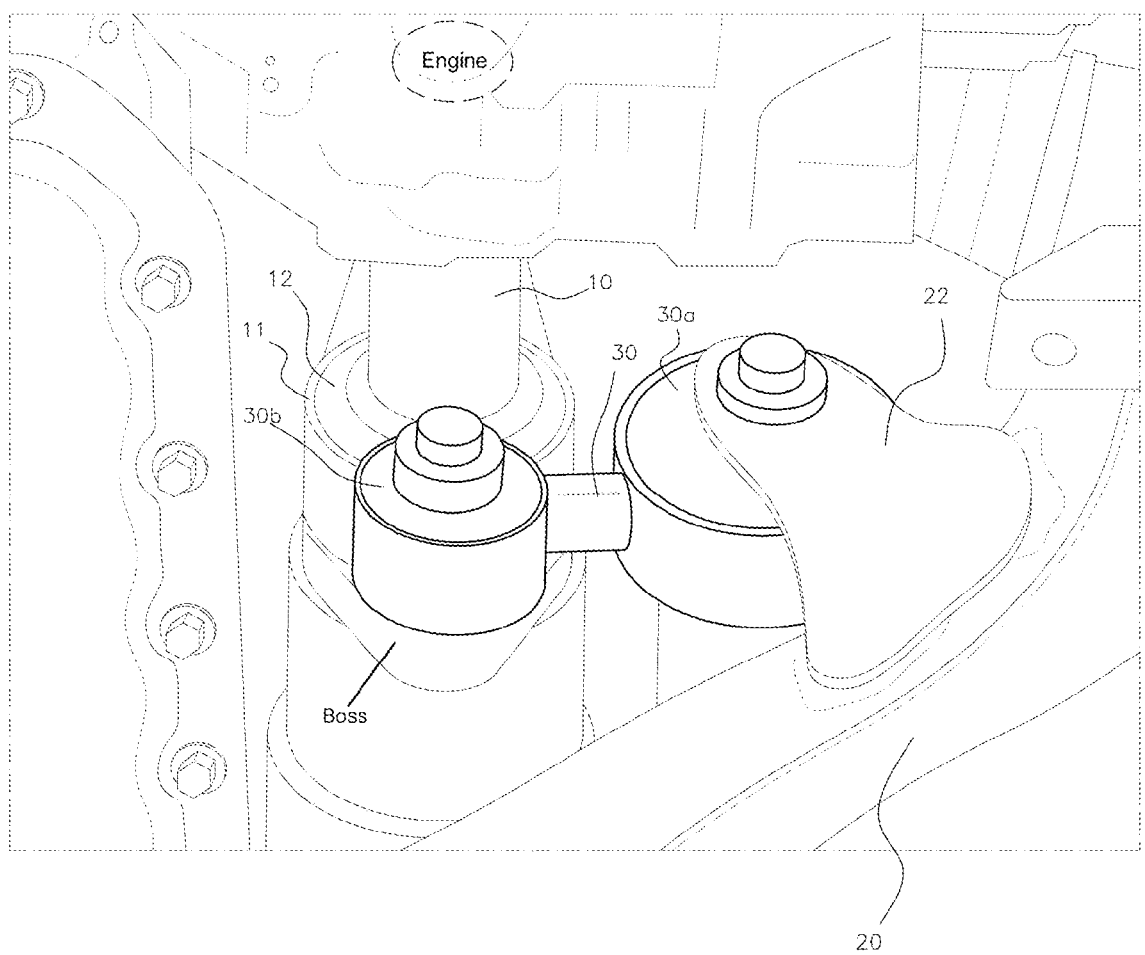
FIG. 3 is a perspective view showing a state in which an exemplary sub-roll rod is coupled according to the present invention when viewed from the bottom.

Meanwhile, a sub-roll rod 30 is mounted at a horizontal-direction one portion of the main roll rod 21 from the top of the subframe 20. One end of the sub-roll rod 30 is connected to a roll rod bracket 22 welded and mounted onto the subframe 20 and the other end of the sub-roll rod 30 is connected to the center bearing bracket 11. For the connection, in the center bearing bracket 11 of the present invention, a boss which can be coupled with the sub-roll rod 30 additionally protrudes downwardly from the center shaft 10 and the sub-roll rod 30 may be mounted by riveting or bolting connection, as shown in FIG. 3.

Meanwhile, rubber-made bushings 30a and 30b are also coupled to both sides of the sub-roll rod 30, and as a result, vibration is damped by the elasticity of the bushings 30a and 30b. In this case, in regards to the bushings, the bushing 30a coupled to the roll rod bracket 22 is larger than the bushing 30b coupled to the center bearing bracket 11

Therefore, the sub-roll rod 30 is disposed to be aligned in a tangent line direction with respect to a rotation direction of the power train (using a coupling point of the engine mount and a coupling point of the transmission mount as axes), as shown in FIG. 4.

Moreover, since both the main roll rod 21 and the sub-roll rod 30 are coupled to the power train, the main roll rod 21 and the sub-roll rod 30 may be disposed to be spaced apart from each other, and as a result, it is possible to damp both the longitudinal-direction vibration and the horizontal-direction vibration more efficiently.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of an engine mount for a vehicle in which an engine is disposed in the front of the vehicle, a front wheel is driven, and the engine is integrally coupled with a transmission to be seated on a vehicle body in a transverse mounting direction, the structure comprising:

a driveshaft coupled to receive driving force of the engine through the transmission and penetrating a center bearing installed through an end of a bearing bracket fixed to the engine;

a subframe having a plate shape coupled to the vehicle body in a rear lower part of the engine and coupled to a lower part of the transmission through a main roll rod mounted on the front; and a sub-roll rod having one end connected to the subframe and another end connected to the bearing bracket fixed to the engine;

wherein the one end of the sub-roll rod is coupled to a roll rod bracket protruding upwardly on the top of the subframe and the another end thereof is coupled to an end of the bearing bracket downwardly from the driveshaft so that a location of the sub-roll rod coupled with the subframe is positioned higher than a location of the sub-roll rod coupled with the bearing bracket;

wherein the main roll rod and the sub-roll rod are disposed to be spaced apart from each other in different directions from the center along the longitudinal direction of the subframe; and wherein in the sub-roll rod, a bushing coupled to the subframe is larger than a bushing coupled to the bearing bracket.

* * * * *